US012386540B2

(12) United States Patent
Boyapalle et al.

(10) Patent No.: US 12,386,540 B2
(45) Date of Patent: Aug. 12, 2025

(54) METHOD AND APPARATUS FOR EDGE STORAGE FOR ENTERPRISE APPLICATIONS

(71) Applicant: Dell Products, LP, Round Rock, TX (US)

(72) Inventors: Anantha K. Boyapalle, Cedar Park, TX (US); Liam B. Quinn, Austin, TX (US); Curtis J. Schwebke, Los Gatos, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 51 days.

(21) Appl. No.: 17/863,702

(22) Filed: Jul. 13, 2022

(65) Prior Publication Data
US 2024/0020040 A1 Jan. 18, 2024

(51) Int. Cl.
*G06F 3/06* (2006.01)
*G06F 12/123* (2016.01)

(52) U.S. Cl.
CPC .......... *G06F 3/0643* (2013.01); *G06F 3/0608* (2013.01); *G06F 3/0653* (2013.01); *G06F 3/067* (2013.01); *G06F 12/123* (2013.01)

(58) Field of Classification Search
CPC .... G06F 3/0643; G06F 3/0608; G06F 3/0653; G06F 3/067
USPC ........................................................ 709/203
See application file for complete search history.

(56) References Cited

U.S. PATENT DOCUMENTS

| | | | |
|---|---|---|---|
| 10,049,051 B1 * | 8/2018 | Baldwin | H04L 67/1097 |
| 10,462,142 B2 | 10/2019 | Pattar | |
| 11,068,544 B2 | 7/2021 | Kudryavtsev | |
| 2017/0293532 A1 * | 10/2017 | Prahlad | G06F 11/1446 |
| 2020/0228602 A1 | 7/2020 | Spoczynski | |
| 2020/0403860 A1 | 12/2020 | Lewis | |
| 2021/0176124 A1 | 6/2021 | Lewis | |
| 2022/0075563 A1 * | 3/2022 | Kishida | G06F 3/0647 |
| 2022/0091903 A1 | 3/2022 | Bai | |
| 2022/0123993 A1 | 4/2022 | Lewis | |
| 2022/0131737 A1 | 4/2022 | Corley | |
| 2022/0318206 A1 * | 10/2022 | Prahlad | H04L 67/56 |
| 2023/0141909 A1 * | 5/2023 | Truscott | H04L 63/02 726/23 |

FOREIGN PATENT DOCUMENTS

| | | | | |
|---|---|---|---|---|
| CN | 114860168 A | * | 8/2022 | G06F 17/18 |
| WO | 2021/188862 A1 | | 9/2021 | |

* cited by examiner

*Primary Examiner* — Tan Doan
(74) *Attorney, Agent, or Firm* — Prol Intellectual Property Law, PLLC; H. Kenneth Prol

(57) ABSTRACT

An information handling system comprising a processor, a memory device, and a power management unit (PMU). The processor to execute computer readable program code of an interim edge storage management system, the processor operatively coupled to a client device, an edge storage device, and a plurality of remote network file hosting systems managed by the interim edge storage management system, wherein the interim edge storage management system includes a storage orchestrator to manage data storage of the client device at and access to the edge storage device and the plurality of remote network file hosting systems based on recency of usage of files to be stored.

20 Claims, 7 Drawing Sheets

METHOD AND APPARATUS FOR EDGE STORAGE FOR ENTERPRISE APPLICATIONS

FIELD OF THE DISCLOSURE

The present disclosure generally relates to data storage. The present disclosure more specifically relates to optimizing data storage of client device files on one or more file hosting systems.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Network communications may allow a user to access a file storage service such as a file hosting system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
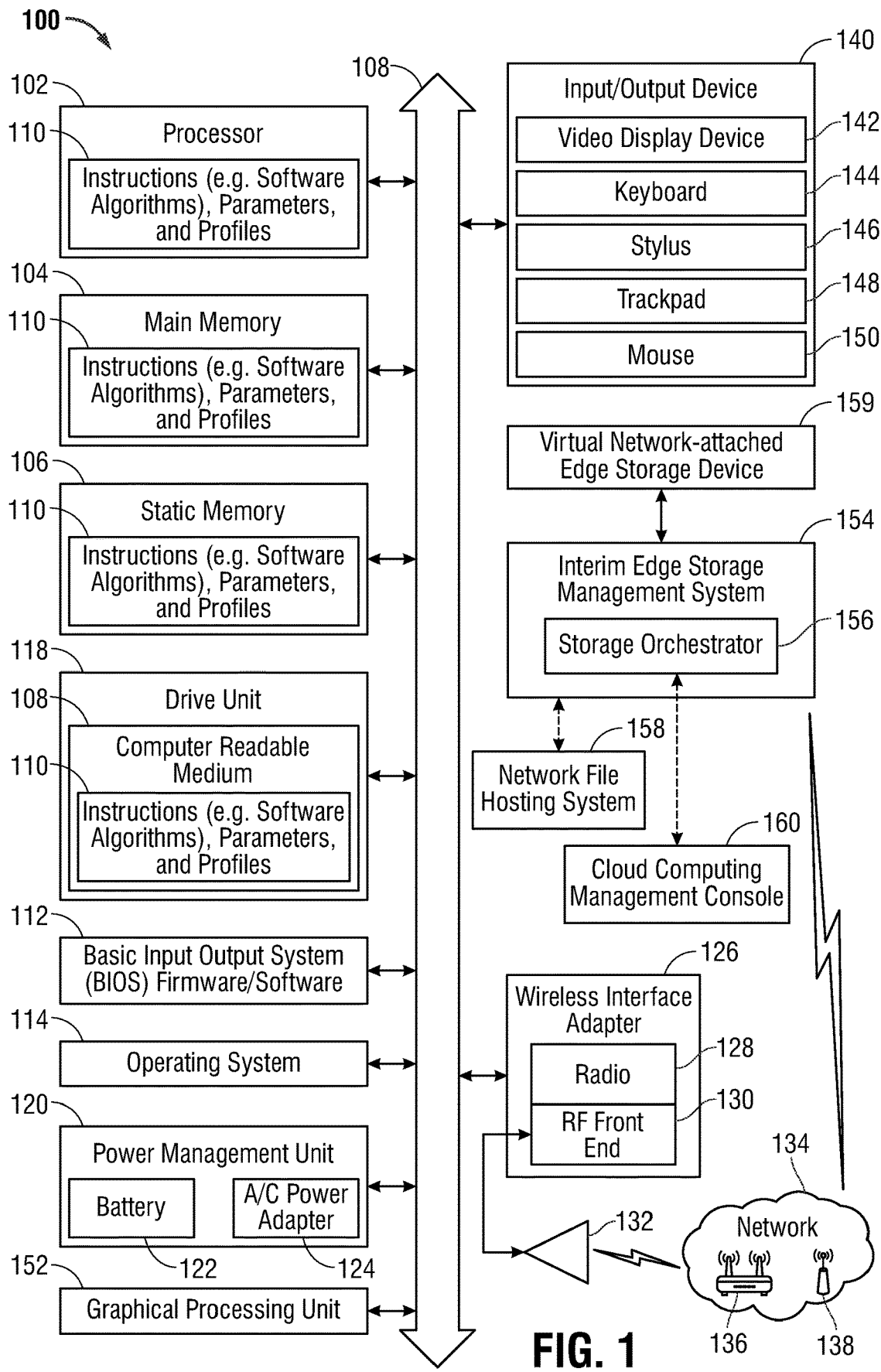
FIG. 1 is a block diagram of an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems allow a system to communicate data with other systems that are remote from the information handling system. Further, files may be shared among a plurality of client information handling systems, in an enterprise for example, in some embodiments. Part of this communication includes the sharing of files to an online network file hosting system for the information handling system or other authorized information handling system to access those files from multiple locations. These network file hosting systems, however, have data storage limits. For example, customers of OneDrive® by Microsoft® may be limited to 1 terabyte (1 TB) per user. These customers may be able to increase the data storage (e.g., 5 TB) with an increased subscription cost. Any additional storage capacities may be limited to the users by administrators of the network file hosting system and may be granted on a case-by-case basis. These extra steps may be cumbersome to the user or an administrator and may increase the costs of operation for the user. Still further, latency issues may arise when a user is attempting to access the files stored on the network file hosting system that may be located at a distant server.

The present specification describes an edge device with storage for every user within, for example, an enterprise. This edge device may be an interim edge storage management system that is operatively coupled to a client device (e.g., information handling system) and a network file hosting system. This interim edge storage management system may include a storage orchestrator that manages data storage of the client device at the network file hosting system. In an embodiment, the storage orchestrator may be operatively coupled to a cloud computing management console that provides active directory synchronization files from a local active directory hosted on a virtual machine that describes how the storage orchestrator manages data storage for the client device between local storage, edge storage, and remote network file hosting systems.

In an embodiment, the active directory synchronization files may include data descriptive of which files from the client devices are stored among local storage, edge storage, or remote network file hosting systems. For example, the active directory synchronization files may be received by the storage orchestrator and the storage orchestrator may store certain files in a virtual network-attached edge storage device for low-latency access to these files by the client device or a plurality of client devices. In an embodiment, the active directory synchronization files may be received by the storage orchestrator and the storage orchestrator may save one or more files in one or more network file hosting systems. This may include the storage orchestrator saving these files among storage locations based on the most recently used (MRU) files. For example, those files most recently accessed, updated, saved, or otherwise manipulated by a client device may be stored on the network file hosting systems.

In an embodiment, the storage orchestrator may save these MRU files to a single network file hosting system. In an embodiment, the storage orchestrator may save these files to a plurality of network file hosting systems using, for example, a round robin scheduling protocol that saves a first MRU file to a first network file hosting system, a second MRU file to a second network file hosting system, a third MRU file to another network file hosting system and so on. In an embodiment, this process may allow the storage orchestrator to store the MRU files until a lowest level of data storage capacity is met on any network file hosting system. When the lowest level of data storage capacity is met on any network file hosting system, the storage orchestrator may engage in a first-in, first-out process by deleting a file from a network file hosting system before saving a new MRU to that network file hosting system.

In an embodiment, the storage orchestrator may execute, via a processing device, one or more application program interfaces (APIs) that allow the storage orchestrator to interface with the network file hosting systems described herein. In an embodiment, the storage orchestrator may be a micro-service of one of the network file hosting systems associated with the interim edge storage management system.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a tablet, a smartphone, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device as well as with an edge device used to orchestrate the sharing of files locally, at the edge, or in the cloud. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), non-volatile (read-only memory, flash memory etc.) or any combination thereof), one or more processing resources, such as a central processing unit (CPU), a graphics processing unit (GPU) 152, processing, hardware, controller, or any combination thereof. Additional components of the information handling system 100 can include one or more storage devices, one or more communications ports for communicating with external devices, as well as, various input and output (I/O) devices 140, such as a keyboard 144, a mouse 150, a video display device 142, a stylus 146, a trackpad 148, or any combination thereof. The information handling system 100 can also include one or more buses 116 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described above. The information handling system 100 may execute code instructions 110 via processing resources that may operate on servers or systems, remote data centers, or on-box in individual client information handling systems according to various embodiments herein. In some embodiments, it is understood any or all portions of code instructions 110 may operate on a plurality of information handling systems 100.

The information handling system 100 may include processing resources such as a processor 102 such as a central processing unit (CPU), accelerated processing unit (APU), a neural processing unit (NPU), a vision processing unit (VPU), an embedded controller (EC), a digital signal processor (DSP), a GPU 152, a microcontroller, or any other type of processing device that executes code instructions to perform the processes described herein. Any of the processing resources may operate to execute code that is either firmware or software code. Moreover, the information handling system 100 can include memory such as main memory 104, static memory 106, computer readable medium 108 storing instructions 110 of, in an example embodiment, a video conferencing application, an image capturing application, or other computer executable program code, and drive unit 118 (volatile (e.g., random-access memory, etc.), nonvolatile (read-only memory, flash memory etc.) or any combination thereof).

As shown, the information handling system 100 may further include a video display device 142. The video display device 142, in an embodiment, may function as a liquid crystal display (LCD), an organic light emitting diode (OLED), a flat panel display, or a solid-state display. Although FIG. 1 shows a single video display device 142, the present specification contemplates that multiple video display devices 142 may be used with the information handling system to facilitate an extended desktop scenario, for example. Additionally, the information handling system 100 may include one or more input/output devices 140 including an alpha numeric input device such as a keyboard 144 and/or a cursor control device, such as a mouse 150, touchpad/trackpad 148, a stylus 146, or a gesture or touch screen input device associated with the video display device 142 that allow a user to interact with the images, windows, and applications presented to the user. In an embodiment, the video display device 142 may provide output to a user that includes, for example, one or more windows describing one or more instances of applications being executed by the processor 102 of the information handling system. In this example embodiment, a window may be presented to the user that provides a graphical user interface (GUI) representing the execution of that application.

The network interface device of the information handling system 100 shown as wireless interface adapter 126 can provide connectivity among devices such as with Bluetooth or to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 136 or base station 138 used to operatively couple the information handling system 100 to a network 134 and, in an embodiment, to an interim edge storage management system 154 described herein. In a specific embodiment, the network 134 may include macro-cellular connections via one or more base stations 138 or a wireless access point 136 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100. Wireless interface adapter 126 may include one or more radio frequency (RF) subsystems (e.g., radio 128) with transmitter/receiver circuitry, modem circuitry, one or more antenna front end circuits 130, one or more wireless controller circuits, amplifiers, antennas 132 and other circuitry of the radio 128 such as one or more antenna ports used for wireless communications via multiple radio access technologies (RATs). The radio 128 may communicate with one or more wireless technology protocols. In and embodiment, the radio 128 may contain individual subscriber identity module (SIM) profiles for each technology service provider and their available protocols for any operating subscriber-based radio access technologies such as cellular LTE communications.

In an example embodiment, the wireless interface adapter 126, radio 128, and antenna 132 may provide connectivity to one or more of the peripheral devices that may include a wireless video display device 142, a wireless keyboard 144, a wireless mouse 150, a wireless headset, a microphone, an audio headset, a wireless stylus 146, and a wireless trackpad 148, among other wireless peripheral devices used as input/output (I/O) devices 140.

The wireless interface adapter 126 may include any number of antennas 132 which may include any number of tunable antennas for use with the system and methods disclosed herein. Although FIG. 1 shows a single antenna 132, the present specification contemplates that the number of antennas 132 may include more or less of the number of individual antennas shown in FIG. 1. Additional antenna system modification circuitry (not shown) may also be included with the wireless interface adapter 126 to implement coexistence control measures via an antenna controller in various embodiments of the present disclosure.

In some aspects of the present disclosure, the wireless interface adapter 126 may operate two or more wireless links. In an embodiment, the wireless interface adapter 126 may operate a Bluetooth wireless link using a Bluetooth wireless or Bluetooth extended protocols. In an embodiment, the Bluetooth wireless protocol may operate at frequencies between 2.402 to 2.48 GHz. Other Bluetooth operating frequencies such as Bluetooth extended frequencies at 6 GHz are also contemplated in the presented description. In an embodiment, a Bluetooth wireless link may be used to wirelessly couple the input/output devices operatively and wirelessly including the mouse 150, keyboard 144, stylus 146, trackpad 148, and/or video display device 142 to the bus 116 in order for these devices to operate wirelessly with the information handling system 100. In a further aspect, the wireless interface adapter 126 may operate the two or more wireless links with a single, shared communication frequency band such as with the 5G standard relating to unlicensed wireless spectrum for small cell 5G operation or for unlicensed Wi-Fi WLAN operation in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas 132 may be capable of operating at a variety of frequency bands. In an embodiment described herein, the shared, wireless communication band may be transmitted through a plurality of antennas used to operate in an N×N MIMO array configuration where multiple antennas 132 are used to exploit multipath propagation which may be any variable N. For example, N may equal 2, 3, or 4 to be 2×2, 3×3, or 4×4 MIMO operation in some embodiments. Other communication frequency bands, channels, and transception arrangements are contemplated for use with the embodiments of the present disclosure as well and the present specification contemplates the use of a variety of communication frequency bands.

The wireless interface adapter 126 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth standards, or similar wireless standards may be used. Wireless interface adapter 126 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, the information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end (e.g., antenna front end 130 circuits) of the information handling system 100 may operate on a licensed WWAN wireless radio with authorization for subscriber access to a wireless service provider on a carrier licensed frequency band.

In other aspects, the information handling system 100 operating as a mobile information handling system may operate a plurality of wireless interface adapters 126 for concurrent radio operation in one or more wireless communication bands. The plurality of wireless interface adapters 126 may further share a wireless communication band or operate in nearby wireless communication bands in some embodiments. Further, harmonics and other effects may impact wireless link operation when a plurality of wireless links are operating concurrently as in some of the presently described embodiments.

The wireless interface adapter 126 can represent an add-in card, wireless network interface module that is integrated with a main board of the information handling system 100 or integrated with another wireless network interface capability, or any combination thereof. In an embodiment the wireless interface adapter 126 may include one or more radio frequency subsystems including transmitters and wireless controllers for connecting via a multitude of wireless links. In an example embodiment, an information handling system 100 may have an antenna system transmitter for Bluetooth, 5G small cell WWAN, or Wi-Fi WLAN connectivity and one or more additional antenna system transmitters for macro-cellular communication. The RF subsystems and radios 128 and include wireless controllers to manage authentication, connectivity, communications, power levels for transmission, buffering, error correction, baseband processing, and other functions of the wireless interface adapter 126.

The information handling system 100 may be operatively coupled to an interim edge storage management system 154 via the network 134 using the wireless interface adapter 126, radio 128, and antenna 132 described herein. The interim edge storage management system 154 may be any device or devices, such as an on-premises server system, that process data for the execution of a storage orchestrator 156. In an embodiment, the interim edge storage management system 154 may include a processing device (e.g., CPU, GPU, microcontroller, or other processing resource) that processes data including computer readable program code of the storage orchestrator 156.

In an embodiment, the interim edge storage management system 154 may receive authentication credentials from a plurality of client devices operatively coupled to the interim edge storage management system 154 such as the information handling system 100 descried herein. The authentication credentials may include a username, a password, and/or other identification data that indicates that the user is allowed to access the interim edge storage management system 154 and its services. In an embodiment, the interim edge storage management system 154 may map each user to each of the plurality of network file hosting systems and one or more edge storage devices 159 to which the interim edge storage management system 154 allows the client devices to upload share file and other data to. In an embodiment, the interim edge storage management system 154 includes a storage orchestrator 156 that does this mapping as well as manage data storage of each of the client devices at the network file hosting systems 158 or one or more edge storage devices 159. This storage orchestrator 156 may cause one or more APIs to be executed by the processor of the interim edge storage management system 154 for the storage orchestrator 156 to communicate with one or more network file hosting systems 158 or one or more edge storage devices 159. Example network file hosting systems 158 may include, for example, Microsoft Azure® developed by Microsoft®, Google Drive® developed by Google®, Amazon Simple Storage Service @developed by Amazon®, and Microsoft OneDrive® developed by Microsoft®, among other network file hosting systems 158.

In an embodiment, the storage orchestrator 156 of the interim edge storage management system 154 may be responsible for moving files from one or more client devices of the enterprise environment. These files may be moved from an edge storage device 159 such as a virtual network-attached edge storage device associated with the interim edge storage management system 154 to one or more of the network file hosting systems 158 or visa-versa described herein. In an embodiment, the storage orchestrator 156 may determine which files to be stored on a network file hosting system 158 or at the edge storage device 159 based on one or more active directory synchronization files received from a cloud computing management console 160. These active directory synchronization files may be generated by a user of a client device, a manger of one or more client devices, or another IT administrator. In an embodiment, the IT administrator may provide client device-specific active directory synchronization files describing how files from a specific client device is to be saved, or not, to the network file hosting systems 158 or to the edge storage device 159. In an embodiment, the IT administrator may provide enterprise-wide active directory synchronization files describing how files from each of the client devices within an enterprise or otherwise operatively coupled to the interim edge storage management system 154 are to be saved, or not, at one or more the network file hosting systems 158 or at an edge storage device 159. In an embodiment, the active directory synchronization files may describe that most recently used (MRU) files that were accessed, updated, saved, or otherwise manipulated by a client device are to be stored on the edge storage device 159 such as a virtual network-attached edge storage device associated with the interim edge storage management system 154 in an embodiment. As the data storage capacities of the network file hosting systems 158 are reached (e.g., 5 TB in Google Drive), those files that are to be saved on the network file hosting systems 158 may be saved in a first-in-first-out process by deleting a file from a network file hosting system 158 before saving a new file to a network file hosting system 158 or some portion stored on an edge storage device 159. It is appreciated that any other type of active directory synchronization files may be received and executed by the storage orchestrator 156 in order to determine which files on the client devices (e.g., information handling system 100) are to be stored on a virtual network-attached edge storage device 159 associated with the interim edge storage management system 154 and/or on one or more of the network file hosting systems 158.

In an embodiment, the storage orchestrator 156 of the interim edge storage management system 154 may provide a snapshot of backups of client device files. In an embodiment, this snapshot may be descriptive of the state of a data storage device at a particular time including what files are stored where, when they were stored, and the file sizes of these files. This snapshot may also include data descriptive of data storage space left to store additional client device files in the virtual network-attached edge storage device 159 or among network file hosting systems 158.

The interim edge storage management system 154 may also include a virtual machine that maintains a local active directory. In an embodiment, the virtual machine may be operatively coupled to the virtual network-attached edge storage device 159. The local active directory of the virtual machine may maintain a directory of client device files stored on the virtual network-attached edge storage device 159 in an embodiment. In an embodiment, the virtual machine may also receive the active directory synchronization files from the cloud computing management console 160 via a cloud active directory in order to pass those active directory synchronization files onto the storage orchestrator 156 as described herein.

During operation, the information handling system 100 as one client device operatively coupled to the interim edge storage management system 154 may boot up and initiate communication with the interim edge storage management system 154. In an embodiment, the information handling system 100 may provide user authentication data such as a username and password to authenticate the information handling system 100 to interface with the interim edge storage management system 154. Because the interim edge storage management system 154 may serve as an edge storage device for multiple information handling systems 100, the data and files stored on the interim edge storage management system 154 (e.g., a virtual network-attached edge storage device 159) may be proprietary and accessible to authenticated and permitted users only.

Once authenticated, the information handling system 100 may determine whether the storage orchestrator 156 is available to manage data storage of the client device at the network file hosting system. Where the storage orchestrator 156 is not available to the user, data files may be stored on the local storage device of the information handling system. The storage orchestrator 156 may not be available to the user based on a number of reasons including, for example, lack of authorization to use the storage orchestrator 156, updating of the computer readable program code executed by the storage orchestrator 156, among other reasons. Where and when the storage orchestrator 156 is available to the user, that data and those files to be stored on the virtual network-attached edge storage device 159 associated with the interim edge storage management system 154 may be stored so that low data access latency may be maintained at the interim edge storage management system 154 by, for example, an enterprise or company for some data. For example, this low latency may provide data and files to a factory at, for example, an assembly line where access to that data and those files needs to be relatively faster than if these files were only stored in a remote network file hosting system 158 for example. However, this data and these files may also need to be accessible to a user via the information handling system 100 when the user has moved away from the enterprise. The storage orchestrator 156 may execute computer readable program code to determine if and when this data and these files are to be stored in one or more remote network file hosting systems 158 as well.

During this time, a cloud computing management console 160 may be accessed by an IT administrator. This cloud computing management console 160 may be implemented to provide active directory synchronization files to the storage orchestrator 156. The active directory synchronization files describe how the storage orchestrator manages data storage for the client device. In an example embodiment, the active directory synchronization files may provide directions to the storage orchestrator 156 so that certain files and data may be saved to certain network file hosting systems 158 based on a number of criteria. For example, the files may or may not be saved based on the type of files to be saved, the type of user of the information handling system 100 (e.g., corporation executive), and the remaining storage capacities of the network file hosting systems 158, among other factors.

The cloud computing management console 160 may synchronize the active directory synchronization files with the storage orchestrator 156 at any time and updates these active directory synchronization files when they are changed by the IT administrator or on a scheduled basis. In one embodiment, the active directory synchronization files may be updated every 7 days. Further, the interim edge storage management system 154 and storage orchestrator 156 may monitor and determine when remote network file hosting systems 158 approach or reach one or more threshold levels of storage capacity. Such thresholds may include when a remote network file hosting system 158 reaches a level where expansion of capacity on that remote network file hosting system 158 is required and available with no additional cost or registration or when expansion requires added cost and additional submission of subscription or authentication data to expand. With the cloud computing management console 160, the IT administrator may be notified of approaching capacity limits in one embodiment. In another embodiment, the interim edge storage management system 154 and storage orchestrator 156 may operate to establish are utilize another API for setup and access to an added remote network file hosting system 158 to add capacity for the user or an enterprise. This addition of a new remote network file hosting system 158 to the existing one or more available may occur automatically with the interim edge storage management system 154 and storage orchestrator 156 in some embodiments. Then tracking stored files and updating file directories for between the new remote network file hosting system 158 and the edge storage device 159 during operation may be edge synched seamlessly and coordinated among plural remote network file hosting systems 158 potentially accessed by a client device 100.

The user operating the information handling system 100 may have a variety of methods of storing data. For example, the user may access data locally on the storage devices of the information handling system 100. In an embodiment where specific data or files do not exist locally, the information handling system 100 may, via the radio 128 and antenna 132, may access the network 134 search for the requested data or files at the virtual network-attached edge storage device 159 of the interim edge storage management system 154. Where the files are located on the virtual network-attached edge storage device 159, the files may be accessed, again, in a fashion that has lower latency access than if that data or those files were stored on a remote network file hosting system 158. In order to determine whether the data or files are stored on the virtual network-attached edge storage device 159 the information handling system 100 may request this information at the storage orchestrator 156 on the interim edge storage management system 154 which includes a directory of what data and files are stored and where those files are stored.

The storage orchestrator 156 may store data and files on the virtual network-attached edge storage device 159 and/or the network file hosting systems 158 based on when that data and those files were last accessed. Where the user has accessed a file at the virtual network-attached edge storage device 159 or locally on the information handling system 100, for example, the storage orchestrator 156 may be notified of this and, based on the instructions from the cloud computing management console 160 via the active directory synchronization files, save the MRU files to the virtual network-attached edge storage device 159 so that these files may be accessed by the information handling system 100 with low latency. In an embodiment, the active directory synchronization files may indicate that if the data or files were accessed at the network file hosting systems 158 or locally on the information handling system 100 within the last seven days, these files are saved to the virtual network-attached edge storage device 159 of the interim edge storage management system 154 so that this data and these files may be accessed quicker than if they were stored on the remote network file hosting system 158 in an embodiment. Where the files are determined to not exist on the virtual network-attached edge storage device 159 by the storage orchestrator 156, the storage orchestrator 156 may access one or more file directories of the remote network file hosting systems 158 and determine where the user-requested data or files are being stored. In an embodiment, this data or files, when located, may be moved to the virtual network-attached edge storage device 159 of the interim edge storage management system 154 as a result of them being requested, accessed, updated, saved, or otherwise manipulated by a client device within a specific time period (e.g., within the last 24 hours). Where the data and files maintained on the virtual network-attached edge storage device 159 have not been accessed during an access time period threshold (e.g., 24 hours), those files may be replaced with any new MRU files using, for example, a first-in-first-out saving protocol. This may limit the amount of storage in the active directory synchronization files while still providing space for those files that have been most recently accessed, updated, saved, or otherwise manipulated by any given user of an information handling system 100. This also allows certain data and files to be stored on the network file hosting systems 158 when they are not repeatedly accessed and do not need to be maintained on the virtual network-attached edge storage device of the interim edge storage management system 154.

The interim edge storage management system 154 described herein provides unlimited data storage for the enterprise of client devices without depending on the network file hosting system 158 for these data storage needs. Further, by maintaining the data on the virtual network-attached edge storage device 159 of the interim edge storage management system 154 via execution of the storage orchestrator 156 as described herein, the data and files may be more secure and more easily managed by an IT administrator. Still further, where needed, any existing subscriptions and access to the network file hosting systems 158 is maintained and the user or the IT administrator may not need to worry about storage limitations on those remote network file hosting systems 158. In an embodiment, because the storage orchestrator 156 executes APIs that automatically provide access to one or more network file hosting systems 158, the user is made unaware of where the files are stored. Still further, because the network file hosting systems 158 each have their own service costs and because each network file hosting system 158 may be under a service contract that includes a storage limit, the storage orchestrator 156 controls, seamlessly, the accessing and storage of any given file on behalf of any client information handling system operatively coupled to the interim edge storage management system 154. This access to the existing network file hosting systems 158 and, potentially, added network file hosting systems 158, is maintained via execution of the one or more APIs at the storage orchestrator 156 and is used to access the individual network file hosting systems 158 in the cloud. Because the low latency of accessing the MRU data and files at the virtual network-attached edge storage device 159, productivity and efficiency in operations may be increased during operations at the enterprise.

The information handling system 100 can include one or more set of instructions 110 that can be executed to cause the computer system to perform any one or more of the methods or computer-based functions disclosed herein. For example, instructions 110 may execute various software applications, software agents, or other aspects or components. Various software modules comprising application instructions 110 may be coordinated by an operating system (OS) 114, and/or via an application programming interface (API). An example OS 114 may include Windows®, Android®, and other OS types known in the art. Example APIs may include Win 32, Core Java API, or Android APIs.

The disk drive unit 118 and may include a computer-readable medium 108 in which one or more sets of instructions 110 such as software can be embedded to be executed by the processor 102 or other processing devices such as a GPU 152 to perform the processes described herein. Similarly, main memory 104 and static memory 106 may also contain a computer-readable medium for storage of one or more sets of instructions, parameters, or profiles 110 described herein. The disk drive unit 118 or static memory 106 also contain space for data storage. Further, the instructions 110 may embody one or more of the methods as described herein. In a particular embodiment, the instructions, parameters, and profiles 110 may reside completely, or at least partially, within the main memory 104, the static memory 106, and/or within the disk drive 118 during execution by the processor 102 or GPU 152 of information handling system 100. The main memory 104, GPU 152, and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The applications and associated APIs described herein, for example, may be stored in static memory 106 or on the drive unit 118 that may include access to a computer-readable medium 108 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In an embodiment, the information handling system 100 may further include a power management unit (PMU) 120 (a.k.a. a power supply unit (PSU)). The PMU 120 may manage the power provided to the components of the information handling system 100 such as the processor 102, a cooling system, one or more drive units 118, the GPU 152, a video/graphic display device 142 or other input/output devices 140 such as the stylus 146, a mouse 150, a keyboard 144, and a trackpad 148 and other components that may require power when a power button has been actuated by a user. In an embodiment, the PMU 120 may monitor power levels and be electrically coupled, either wired or wirelessly, to the information handling system 100 to provide this power and coupled to bus 116 to provide or receive data or instructions. The PMU 120 may regulate power from a power source such as a battery 122 or A/C power adapter 124. In an embodiment, the battery 122 may be charged via the A/C power adapter 124 and provide power to the components of the information handling system 100 via a wired connections as applicable, or when A/C power from the A/C power adapter 124 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
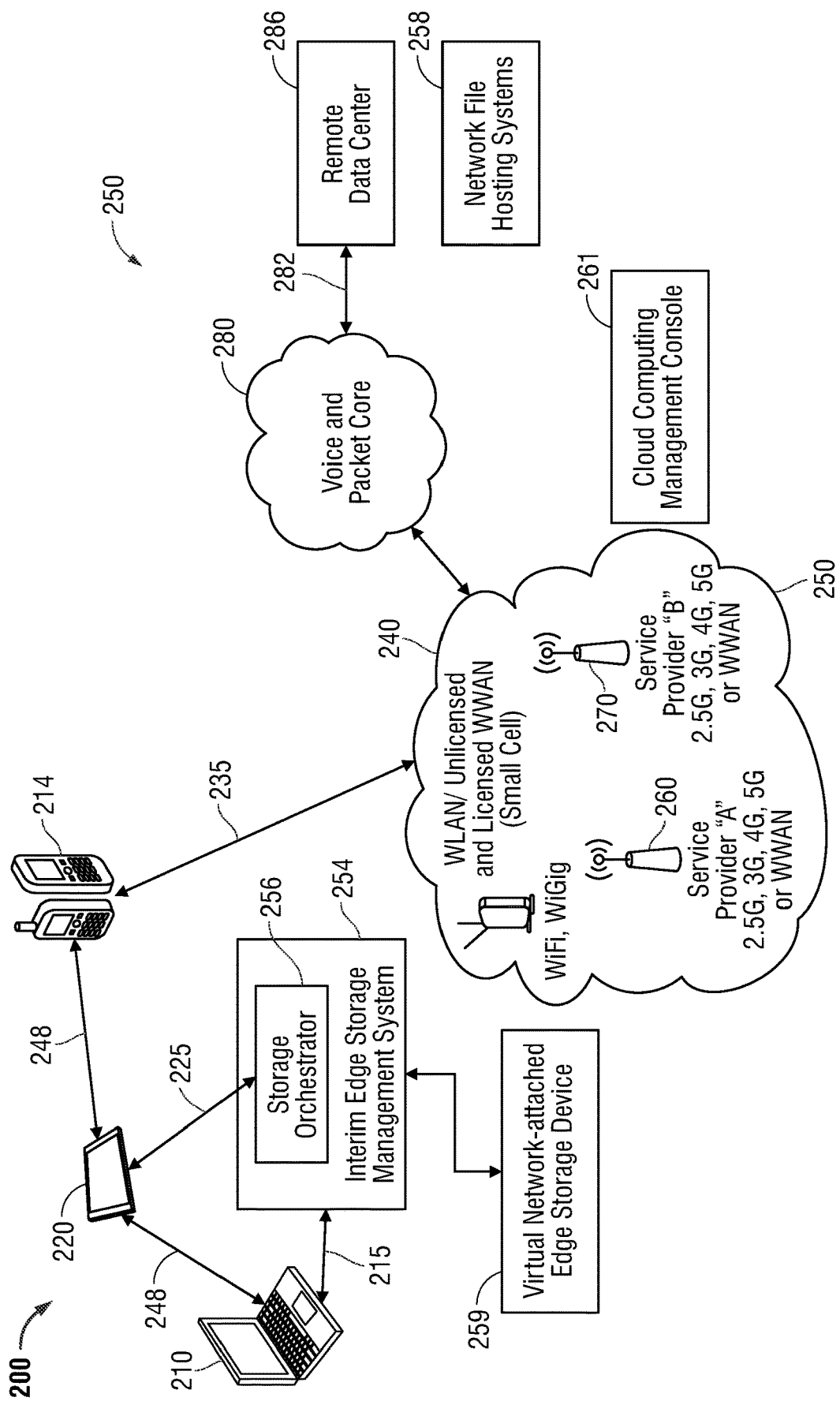
FIG. 2 is a block diagram of a network environment offering several communication protocol options and mobile information handling systems according to an embodiment of the present disclosure.

FIG. 2 illustrates a network 200 that can include one or more information handling systems 210, 212, 214. The information handling systems 210, 212, 214 shown in FIG. 2 may be similar to the information handling system 100 and described in connection with FIG. 1, respectively. In an embodiment, the information handling systems 210, 212, 214 may be operatively coupled to an interim edge storage management system 254. In an embodiment, the interim edge storage management system 254 may be part of an edge device and may include a virtual network attached edge storage device 259 on part of the edge device or attached to the edge device that is placed between the information handling systems 210, 212, 214 (e.g., client devices) and one or more network file hosting systems 258. The macro-cellular network 250 and/or wireless local network 240 may be used by the interim edge storage management system 254 to be operatively coupled to the interim edge storage management system 254. In an embodiment, a cloud computing management console 261 may also be operatively coupled to the wireless local network 240 and/or macro-cellular network 250. The cloud computing management console 160, in an embodiment, may be operated by one of the information handling systems 210, 212, 214 or a dedicated computing device.

In a particular embodiment, network 200 includes networked mobile information handling systems 210, 212, 214, wireless network access points, and multiple wireless connection link options. A variety of additional computing resources of network 200 may include client mobile information handling systems, data processing servers, network storage devices, local and wide area networks, or other resources as needed or desired. As partially depicted, information handling systems 210, 212, 214 may be a laptop computer, tablet computer, 360-degree convertible systems, wearable computing devices, or a smart phone device. These information handling systems 210, 212, 214, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points (e.g., 136, FIG. 1) or base stations (e.g., 138, FIG. 1) may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or emerging 5G small cell WWAN communications such as gNodeB, eNodeB, or similar wireless network protocols and access points. Alternatively, other available wireless links within network 200 may include macro-cellular connections 250 via one or more service providers 260 and 270. As described herein, a plurality of antennas may be operatively coupled to any of the macro-cellular connections 250 via one or more service providers 260 and 270 or to the wireless local area networks (WLANs) selectively based on the SAR data, RSSI data, configuration data, system operation and connection metrics, peripheral telemetry data, and antenna mounting locations (e.g., spatial locations of antennas within the information handling system) associated with each information handling systems 210, 212, 214 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 240, 250 may be based on the radio access network (RAN) standards that implement, for example, eNodeB or gNodeB hardware connected to mobile phone networks (e.g., cellular networks) used to communicate with the information handling systems 210, 212, 214. In the example embodiment, mobile one or more information handling systems 210, 220, 230 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the information handling systems 210, 212, 214 may operate on a licensed WWAN wireless radio with authorization for subscriber access to a wireless service provider on a carrier licensed frequency band. WLAN such as Wi-Fi (e.g., Wi-Fi 6) may be unlicensed.

As described herein, an interim edge storage management system 254 may operate with an associated virtual network attached edge storage device 259. The interim edge storage management system 254 may be placed at an edge of the network, for example, on the premises at an enterprise in an embodiment. By placing the virtual network attached edge storage device 259 on the edge, the enterprise may access files stored on the virtual network attached edge storage device 259 of the interim edge storage management system 254 at a lower latency for quick access to those files.

The voice and packet core network 280 shown in FIG. 2 may contain externally accessible computing resources and connect to a remote data center 286. An external accessible computing resource at the remote data center 286 includes the one or more network file hosting systems 258 used by the interim edge storage management system 254 and storage orchestrator 256 to store, for example, data and files from the information handling systems 210, 212, 214 that are not the MRU files but are to be accessed by the information handling systems 210, 212, 214 remotely, for example. The voice and packet core network 280 may contain multiple intermediate web servers or other locations with accessible data (not shown). The voice and packet core network 280 may also connect to other wireless networks similar to the wireless local network 240 or the macro-cellular network 250 and additional mobile information handling systems such as 210, 212, 214, or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more information handling systems 210, 212, 214. Alternatively, mobile information handling systems 210, 212, 214 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices (e.g., network file hosting systems 258), local and wide area networks, or other resources as needed or desired. In an embodiment, the remote data center 286 may include the machine data storage devices that store the computer code and instructions that define the remote network file hosting systems 258.

Although communication links 215, 225, and 235 are shown connecting wireless adapters of information handling systems 210, 212, 214 to wireless networks 240 or 250, a variety of wireless links are contemplated. Wireless communication may link through a wireless access point (e.g., Wi-Fi), through unlicensed WWAN small cell base stations such as in network 240 or through a service provider tower and base stations such as that shown with service provider A 260 or service provider B 270 and in network 250. In other aspects, mobile information handling systems 210, 212, 214 may communicate intra-device via inter-communication links 248 when one or more of the information handling systems 210, 212, 214 are set to act as an access point or even potentially an WWAN connection via small cell communication on licensed or unlicensed WWAN connections. For example, one of mobile information handling systems 210, 212, 214 may serve as a Wi-Fi hotspot in an embodiment. Concurrent wireless links to information handling systems 210, 212, 214 may be connected via any access points including other mobile information handling systems as illustrated in FIG. 2.

Figure 3:
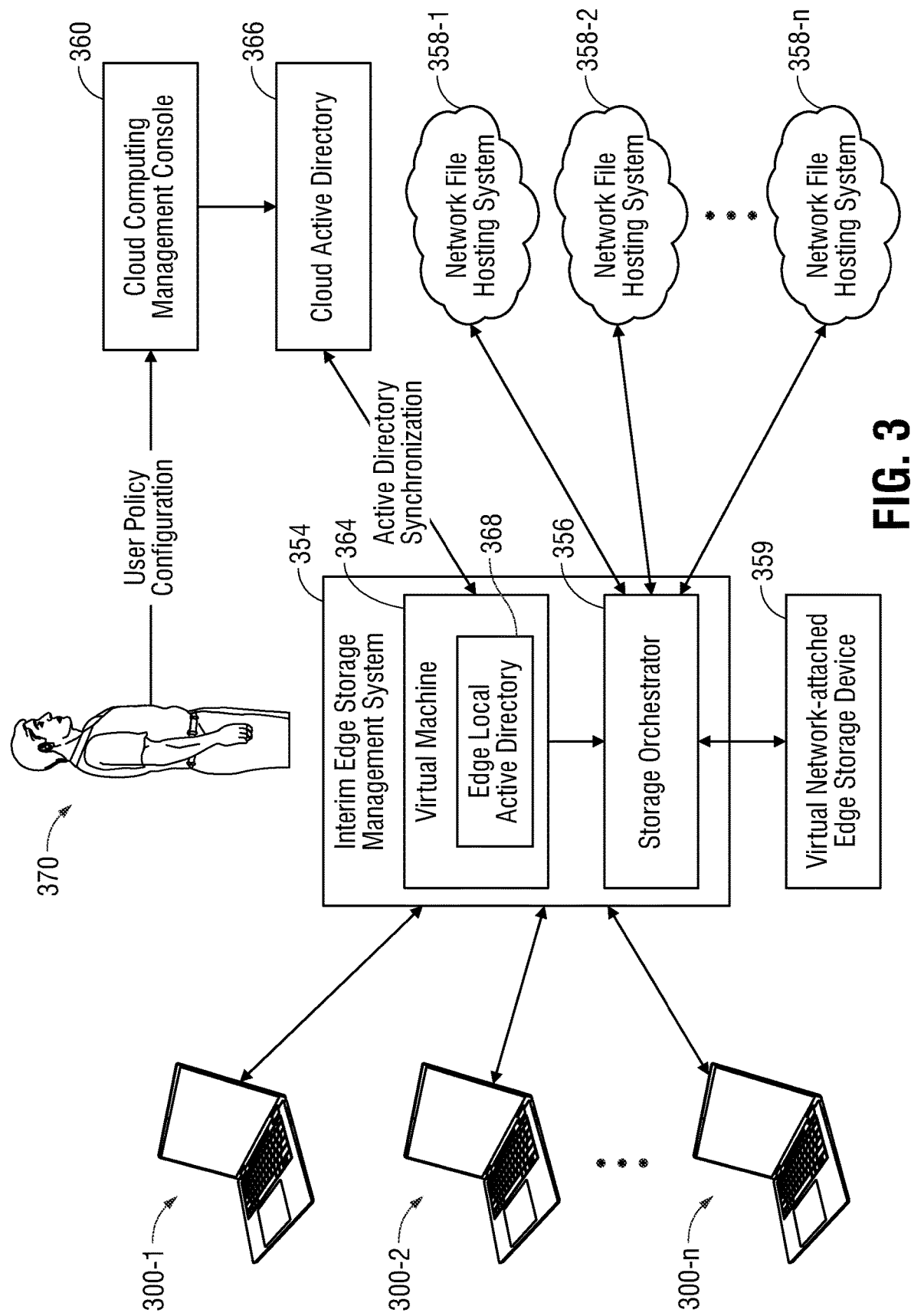
FIG. 3 is a block diagram of a network edge server executing an interim edge storage management system in an embodiment of the present disclosure.

FIG. 3 is a block diagram of a network edge server executing an interim edge storage management system 354 in an embodiment of the present disclosure. As described herein, the interim edge storage management system 354 may be on an edge device such as a server operatively coupled to one or more information handling systems 300-1, 300-2, 300-n. The information handling systems 300-1, 300-2, 300-n may each be client devices that use the interim edge storage management system 354 to determine where data and files accessed, updated, saved, or otherwise manipulated by the client devices are to be stored. As described herein in an embodiment, the interim edge storage management system 354 executes a storage orchestrator 356 that directs the storage of files and data to one of a virtual network-attached edge storage device 359 or one or more network file hosting systems 358-1, 358-2, 358-n based on active directory synchronization files.

The interim edge storage management system 354 may periodically receive the active directory synchronization files from a cloud computing management console 360 via a cloud active directory 366. The cloud computing management console 360 may be used by an IT administrator 370 to create and push the active directory synchronization files that describe how the storage orchestrator 356 manages data storage for the client device. For example, the active directory synchronization files may indicate which files accessed by the information handling systems 300-1, 300-2, 300-n are allowed to store data or files on the virtual network-attached edge storage device 359 and which of these data and files qualify as MRU data and files. In an embodiment, the cloud active directory 366 may authenticate and authorize all users operating an information handling system 300-1, 300-2, 300-n and computers in a domain-type network, assigning and enforcing security policies for all information handling systems 300-1, 300-2, 300-n, and installing or updating software, among other tasks apart from passing the active directory synchronization files to the interim edge storage management system 354.

The interim edge storage management system 354, in an embodiment, includes a virtual machine 368 that includes an edge local active directory 368. The virtual machine 364 may receive the active directory synchronization files from the cloud active directory 366 and maintain those with active directory synchronization for files stored on the virtual network-attached edge storage device 359 for access to the active directory synchronization files by the storage orchestrator 356. The edge local active directory 368 may maintain data descriptive of those information handling systems 300-1, 300-2, 300-n and their users allowed to and currently accessing and operatively coupled to the interim edge storage management system 354 as well as a directory of data and files stored on the virtual network-attached edge storage device 359. The virtual machine 364 may, in an embodiment, assign processing resources associated with the interim edge storage management system 354 to be used by the storage orchestrator 356 to manage the data and files accessed, updated, saved, or otherwise manipulated by a client device (e.g., information handling systems 300-1, 300-2, 300-n).

As described herein, the storage orchestrator 356 may trigger an edge synch process used to determine whether data or files have been accessed, updated, saved, or otherwise manipulated by an information handling system 300-1, 300-2, 300-n within an access time period threshold (e.g., within the last 24 hours, last 7 days, or other access time period threshold). Where the data or files have not been accessed by any of the network file hosting systems 358-1, 358-2, 358-n within that access time period threshold, the data or files may be saved to a network file hosting system 358-1, 358-2, 358-n. Where the data or files have been accessed by any of the information handling systems 300-1, 300-2, 300-n within that access time period threshold, the data or files may be saved to a virtual network-attached edge storage device 359 at the interim edge storage management system 354 to provide low latency access to those files while not recopying local storage and memory on the client information handling systems 300-1, 300-2, 300-n. Further, use of virtual network-attached edge devices 362 further provides low-latency for shared files within the access time period threshold among files shared with a plurality of client information handling systems 300-1, 300-2, 300-n. Further, in an embodiment, the storage orchestrator 356 manages files within the virtual network-attached edge storage device 359 that are to be saved therein. In an example embodiment, the storage orchestrator 356 may determine if and when the virtual network-attached edge storage device 359 capacity is full and add and remove the MRU files in a first-in-first-out process that, regardless of the access time period threshold, saves those files that were first saved in the virtual network-attached edge storage device 359 to a network file hosting system 358-1, 358-2, 358-n.

As described herein, the storage orchestrator 356 may cause one or more APIs to be executed by the processor of the interim edge storage management system 354 for the storage orchestrator 356 to communicate with one or more network file hosting systems 358-1, 358-2, 358-n or virtual network-attached edge storage device 359. Example network file hosting systems 358-1, 358-2, 358-n may include, for example, Microsoft Azure® developed by Microsoft®, Google Drive® developed by Google®, Amazon Simple Storage Service® developed by Amazon®, and Microsoft OneDrive® developed by Microsoft®, among other network file hosting systems 358-1, 358-2, 358-n. In an embodiment, because the storage orchestrator 356 executes APIs that automatically provide access to one or more network file hosting systems 358-1, 358-2, 358-n, the user may be unaware of where the files are stored. The user has no need to provide specific credentials or authentication to access each or any of the one or more network file hosting systems 358-1, 358-2, 358-n. In other words, this access to the network file hosting systems 358-1, 358-2, 358-n or the virtual network-attached edge storage device 359 is completed without the user of the client information handling systems 300-1, 300-2, 300-n needing to input usernames or login information to access the files. Access to any of these locations is seamlessly managed along with local storage at the client devices 300-1, 300-2, and 300-1 by the storage orchestrator 356 and with the edge local active directory 368 of the interim edge storage management system 354 and virtual machine 364. Still further, because the network file hosting systems 358-1, 358-2, 358-n each have their own service costs and because each network file hosting systems 358-1, 358-2, 358-n under a service contract has a storage limit, the storage orchestrator 356 controls, seamlessly, the accessing and storage of any given file on behalf of any client information handling system operatively coupled to the interim edge storage management system 354. During operation, additional access to other network file hosting systems 358-1, 358-2, 358-n may be seamlessly provided if and when any given network file hosting system 358-1, 358-2, 358-n becomes full.

Figure 4:
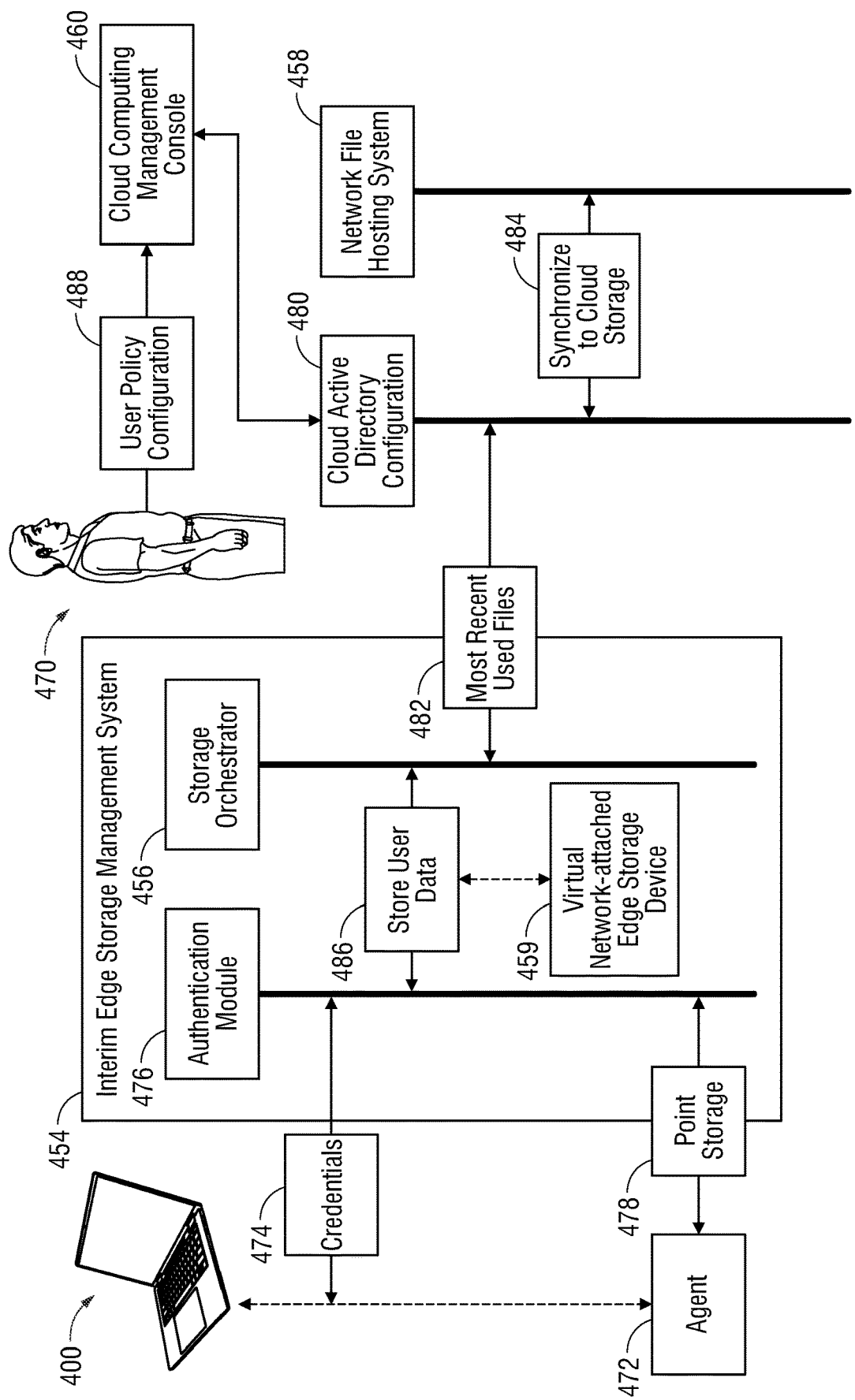
FIG. 4 is a block process diagram describing a method of operating an interim edge storage management system according to an embodiment of the present disclosure.

FIG. 4 is a block process diagram describing a method of operating an interim edge storage management system 454 according to an embodiment of the present disclosure. As described herein, an information handling system 400 may be used to initially authenticate the user with the interim edge storage management system 454 via an authentication module 476 at the interim edge storage management system 454. At this point, credentials 474 may be provided to the interim edge storage management system 454 by the information handling system 400 such as a username or password. The storage orchestrator 456 may also be provided with the user data for processing of data from or on behalf of the user of the information handling system 400. Once authenticated by authentication module 476 at the interim edge storage management system 454, the information handling system 400 may execute an agent 472 or other computer readable program code acting on behalf of the information handling system 400 to point to the storage at 478 and access data or files stored either on a virtual network-attached edge storage device 459 or on one or more of the network file hosting systems 458.

In an embodiment, the interim edge storage management system 454 may periodically receive the active directory synchronization files from a cloud computing management console 460 via a cloud active directory. The cloud computing management console 460 may be used by an IT administrator 470 to configure user policies and create and push the active directory synchronization files in a user policy configuration 488 that describe how the storage orchestrator 456 manages data storage for the client device 400. For example, the active directory synchronization files may indicate which files accessed by the information handling systems 400 are allowed to store data or files 486 on the virtual network-attached edge storage device 459 and which of these data and files qualify as MRU data and files 482. In an embodiment, the cloud active directory configuration 480 may authenticate and authorize all users operating an information handling system 400 and computers in a domain-type network, assigning and enforcing security policies for all information handling systems 400, and installing or updating software, among other tasks apart from passing the active directory synchronization files for data and files synchronized to the cloud storage 484 to the interim edge storage management system 454.

The cloud computing management console 460 may push the active directory synchronization files for configuration 480 to the storage orchestrator 456. Those files that are MRU files may be stored in the virtual network-attached edge storage device 459 associated with the interim edge storage management system 454 per the active directory synchronization files received by the storage orchestrator 456. Those files that are deemed to not be recently used may be synchronized and stored in one or more network file hosting systems 458 in the cloud storage at 484 per the active directory synchronization files received by the storage orchestrator 456.

As described herein, the user may cause the information handling system 400 to request a file. This file may be located on the information handling system 400, at the virtual network-attached edge storage device 459, and/or at the network file hosting system 458. The agent 472 may interface with the storage orchestrator 456 of the interim edge storage management system 454 in order to point to the storage at 478 where a copy of this file is located. This process is completed seamlessly without the user of the information handling system knowing that the agent 472 is accessing the file from the local storage of the information handling system 400, from the virtual network-attached edge storage device 459, or from the one or more network file hosting systems 458. Where the file is located on one or more network file hosting systems 458, the storage orchestrator 456 may cause one or more APIs to be executed by the processor of the interim edge storage management system 454 for the storage orchestrator 456 to communicate with one or more network file hosting systems 458 or virtual network-attached edge storage device 459.

Figure 5:
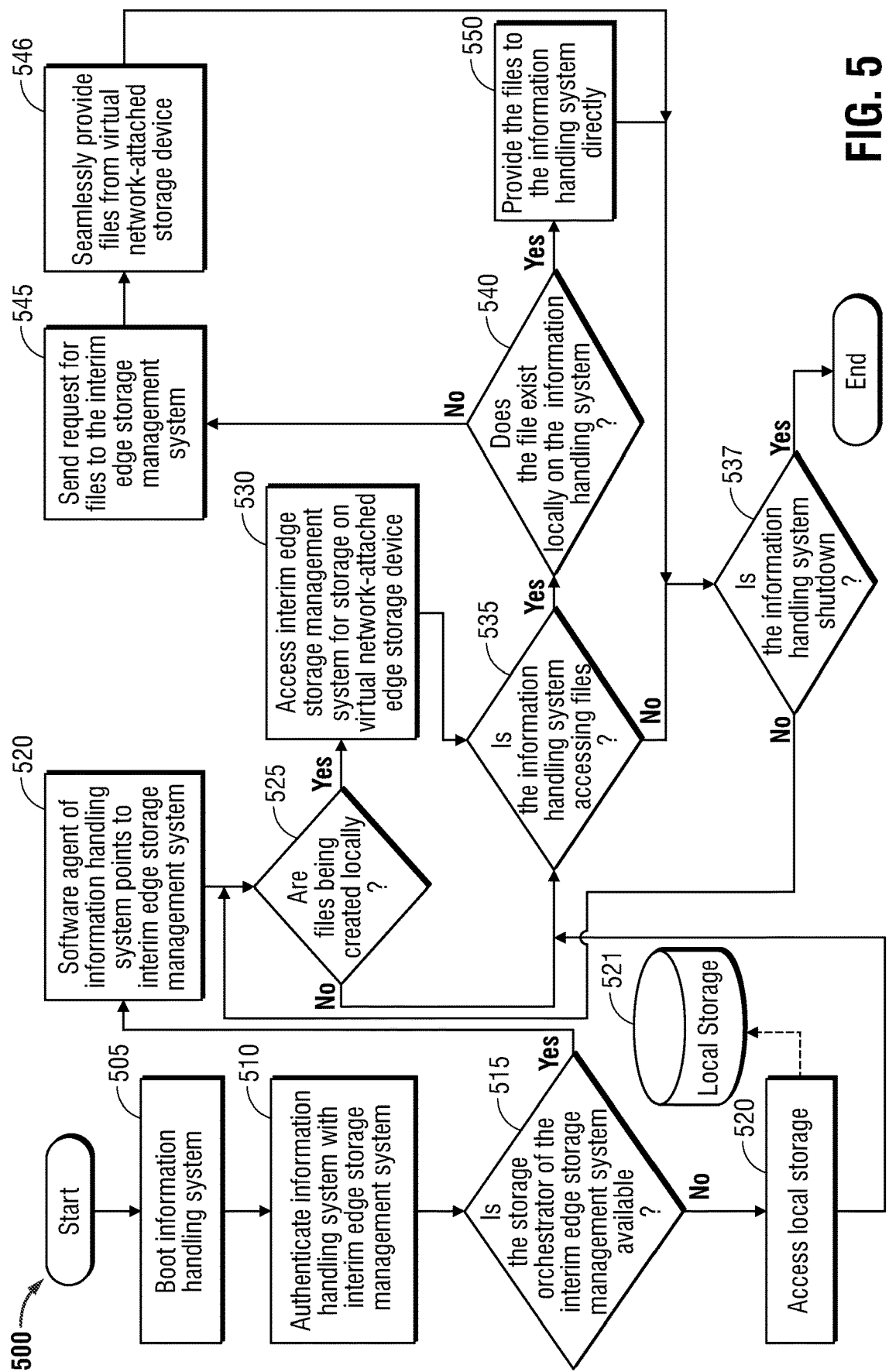
FIG. 5 is a flow diagram of a method of an information handling system operatively coupled to an edge device executing an interim edge storage management system according to an embodiment of the present disclosure.

FIG. 5 is a flow diagram of a method 500 of an information handling system operatively coupled to an edge device executing an interim edge storage management system according to an embodiment of the present disclosure. As described herein, the information handling system may be one of many information handling systems operatively coupled to the interim edge storage management system and the processes described in FIGS. 5 through 7 may be applicable to any number of information handling systems.

The method 500 may begin with booting of the information handling system at block 505. This booting process at block 505 may include executing a BIOS and OS on the information handling system. During the booting process, the processing device may cause a software agent associated with initiating a communication with the interim edge storage management system. This startup application may be represented as an icon on an application tray at the video display device for the user to access authentication settings. Upon startup of the software agent, the user may be requested, via the video display device, to enter in a username and password transmitted to the interim edge storage management system in order to gain access to the interim edge storage management system and the services provided by the storage orchestrator. The method 500 includes authenticating the information handling system with an authentication module of the interim edge storage management system at block 510 to verify the entered credentials to access the edge stored or remotely stored files. Any authentication of a user may be used including biometrics, embedded cryptographic keys or other authentication processes.

The method 500 includes determining whether the storage orchestrator of the interim edge storage management system is available to manage data storage of the client device at plural storage locations including the virtual network-attached edge storage device and one or more the network file hosting systems at block 515. Where the storage orchestrator is not available to the user, data files may be stored on the local storage device 521 at the client information handling system with the processing device of the client information handling system accessing this local data storage device 521 (e.g., main memory 104, static memory 106, computer readable medium 108, etc. in FIG. 1) at block 520. The storage orchestrator may not be available to the user based on a number of reasons including, for example, lack of authorization to use the storage orchestrator and updating of the computer readable program code executed by the storage orchestrator, among other reasons. Because the storage orchestrator on the interim edge storage management system is not available in this example embodiment, the method 500 may end.

Where the storage orchestrator of the interim edge storage management system is available at block 515, the method 500 may include executing, with the processor of the information handling system, a software agent to point to the interim edge storage management system in order to allow the user to interact with the storage orchestrator thereon and access the services provided by the interim edge storage management system. As described herein, this may include the automatic storage of a user-created file and/or access of files stored by the storage orchestrator either on one of a plurality of network file hosting systems or a virtual network-attached edge storage device. It is appreciated, however, that via the execution of the software agent by the processor of the information handling system, the user is not made aware of whether the files being accessed or stored by the storage orchestrator are located on the network file hosting systems or on the virtual network-attached edge storage device. This relieves the user with having to know individual sign-in information the virtual network-attached edge storage device, the plurality of network file hosting systems, having to search for a specific file, or otherwise knowing what files are stored where. This allows the storage orchestrator of the interim edge storage management system to manage the storage and curation of those files without the involvement of the user.

The method 500 includes, at block 525, with determining whether a file is being created locally at the client information handling system. A file created locally may be saved on the virtual network-attached edge storage device associated with the interim edge storage management system so as to reduce the amount of data storage at the information handling system as well as allow the created files to be shared among a plurality of users on other client information handling systems also operatively coupled to and communicating with the interim edge storage management system. In this way, latency is reduced for the client information handling system and other client information handling systems for recent, locally created files.

Where there are no files being created at block 525, the method 500 may end. Where the file is being created at block 525, the information handling system may access the interim edge storage management system for storage of the created file on the virtual network-attached edge storage device at block 530. In this example embodiment, because the file was created by the information handling system and is being saved by the storage orchestrator, this file qualifies as an MRU file and files within an access time period threshold such as an MRU file are saved onto the virtual network-attached edge storage device. The MRU files are saved on the virtual network-attached edge storage device in order to reduce the latency of access to these files.

The method may include, at block 535, with determining whether the information handling system is accessing any other files stored by the storage orchestrator online on, for example, the virtual network-attached edge storage device or on the one or more network file hosting systems. Where the user is not attempting to access one or more of these files at block 535, the method 500 may continue with determine whether the information handling system is shut down or shutting down at block 537. Where the information handling system is shutting down at block 537, the method 500 may end. Where the information handling system is not shutting down at block 537, the method 500 may continue with block 525 with monitoring for files being created by the client information handling system and whether the information handling system is requesting files located on a virtual network-attached edge storage device and/or one or more network file hosting systems.

Where it is detected by the processor that the information handling system has requested access to one or more files online at block 535, the method 500 may continue at block 540 with determining if the file exists on the local data storage device of the information handling system. Where those files are not located on the local data storage device of the information handling system, at block 540, the method 500 may continue to block 545 with the information handling system sending a request to the storage orchestrator of the interim edge storage management system for these files. The storage orchestrator and the interim edge storage management system may access an active directory to locate the files at a virtual network attached edge storage device, for example if the file requested is an MRU from the requesting client device or another client device managed by the interim edge storage management system in an embodiment. Alternatively, the storage orchestrator may determine that the requested file is stored at one of a plurality of remote network file hosting systems and retrieve the file from the correct remote network file hosting system in another embodiment. This may cause the file to be added to virtual network attached edge storage device for future access and the active directory of the interim edge storage management system and the storage orchestrator to be updated. At this point, the method may proceed to block 546 with the user at a client device receiving those files stored online either from an edge storage device or from one or more remote network file hosting system with the location determined as described embodiments herein. Then the flow may proceed to block 537 to determine if the information handling system has shut down.

Where the file requested by the user is saved locally on the information handling system as determined at block 540, the method 500 includes providing those files to the information handling system directly at block 550. Then the flow may proceed to block 537 to determine if the information handling system has shut down. In this way, one or more client information handling systems that are authenticated may seamlessly access files and data stored among local storage, virtual network-attached edge storage, or one or more network file hosting systems as determined and coordinate by the storage orchestrator according to embodiments herein.

Figure 6:
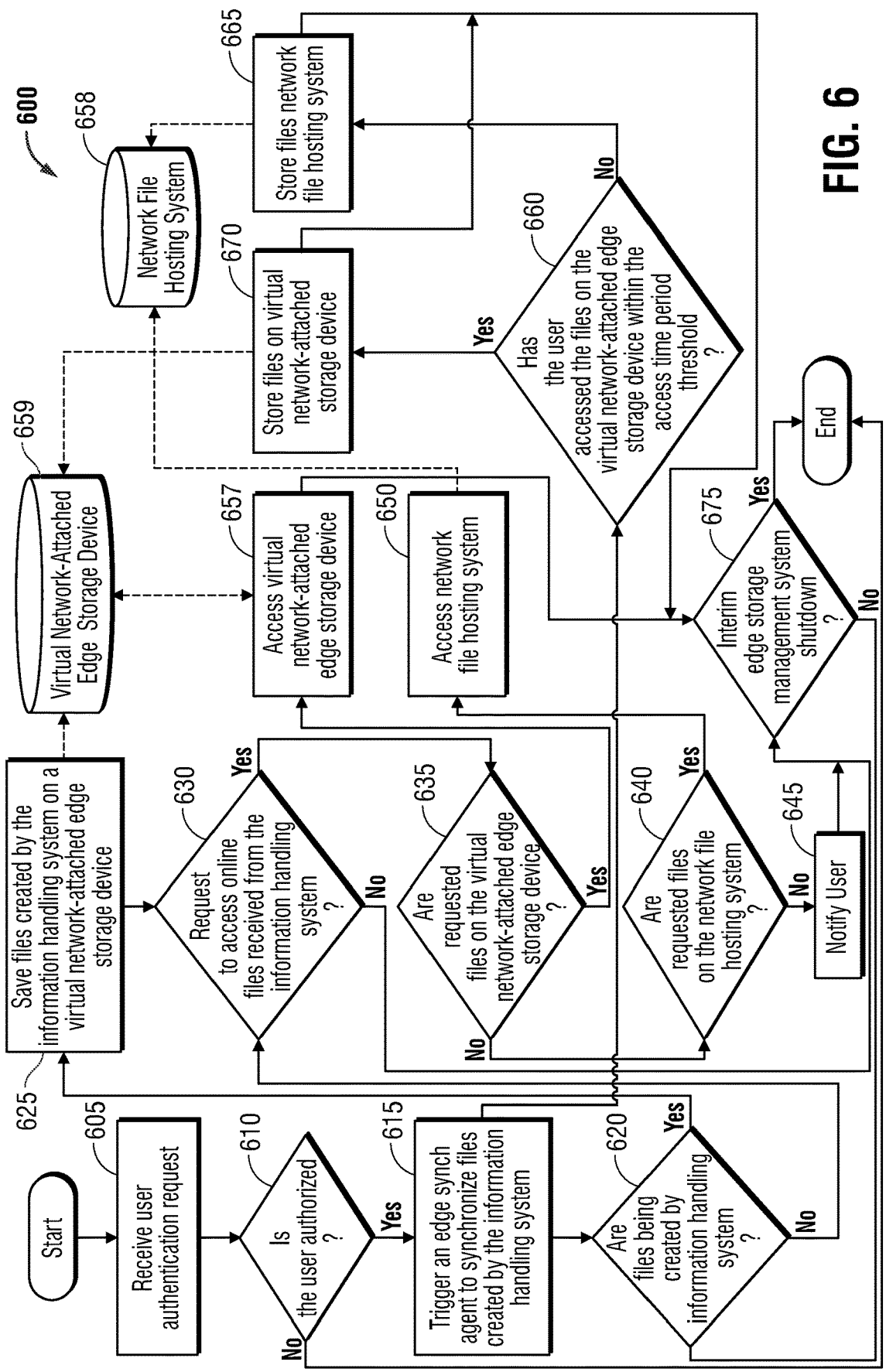
FIG. 6 is a flow diagram of a method of executing an interim edge storage management system according to an embodiment of the present disclosure.

As before, at block 537, the system may determine whether the information handling system is shut down or shutting down. Where the information handling system is shutting down at block 537, the method 500 may end. Where the information handling system is not shutting down at block 537, the method 500 may continue with block 525 with monitoring for files being created by the client information handling system and whether the information handling system is requesting files located on a virtual network-attached edge storage device and/or one or more network file hosting systems. FIG. 6 is a flow diagram of a method 600 of executing an interim edge storage management system according to an embodiment of the present disclosure.

FIG. 6 is from the perspective of an interim edge storage management system that is operatively coupled to one or more information handling systems and one or more network file hosting systems. The interim edge storage management system, in an embodiment, acts as an intermediary device that directs the storage of data and files to one of a virtual network-attached edge storage device or one or more network file hosting systems. The files saved may be created by one or more client information handling systems that are, at least, backed up on one of the virtual network-attached edge storage devices or the one or more network file hosting systems in an embodiment.

The method 600 may include, at block 605 with receiving user authentication from one or more of the information handling systems operatively coupled to the interim edge storage management system. The user authentication may include a password, a username, or other login information. Any authentication of a user may be used including password or login credentials, biometrics, embedded cryptographic keys or other authentication processes. In an embodiment, the login or authentication information may allow a user to access the storage resources, at least, of the interim edge storage management system (e.g., virtual network-attached edge storage device) and one or more network file hosting systems without the user of the client device needing to manage access to these multiple storage sources. In an embodiment, the client information handling systems operatively coupled to this interim edge storage management system include an agent to automatically provide the authentication data and access the services provided by the interim edge storage management system. This authentication process is completed seamlessly without the user of the information handling system knowing that the agent is requesting, in the embodiments herein, the interim edge storage management system to access a file from the local storage of the information handling system, from the virtual network-attached edge storage device, or from the one or more network file hosting systems. Where the file is located on one or more network file hosting systems, a storage orchestrator of the interim edge storage management system may cause one or more APIs to be executed by the processor of the interim edge storage management system for the storage orchestrator to communicate, seamlessly, with one or more network file hosting systems 458 or virtual network-attached edge storage device. Further, the interim edge storage management system may manage file locations for availability to a plurality of client information handling systems that provide authentication information to allow seamless and efficient sharing of these files among the plurality of client information handling systems in some embodiments. For example, the plurality of client information handling systems may be managed by an enterprise which also administers the interim edge storage management system.

The method 600 may include a determination as to whether the user is authorized to access the interim edge storage management system at block 610. As described herein, the interim edge storage management system may direct the storage of proprietary information and access to these files and data may be limited to only those users, whether part of an enterprise or not, who are allowed to view the information. Where the user is not authorized at block 610, the method may end. Where the user is authorized at block 610, the method may continue to block 615.

In an embodiment, the method includes triggering an edge synch agent to synchronize files created at the information handling system at block 615. The edge synch agent may be used to synchronize those files that have been created on the information handling system with those stored on the virtual network-attached edge storage device or the one or more network file hosting systems. In an embodiment, the edge synch agent may be computer readable program code that is executed by processing resources on the interim edge storage management system. In an embodiment, the edge synch agent may also request and receive active directory synchronization files from a cloud computing management console that instruct the storage orchestrator of the interim edge storage management system as to how and under what conditions the storage orchestrator stores data or files on the virtual network-attached edge storage device or one or more network file hosting systems.

Where the user is authorized at block 610 and the edge such agent has been triggered at block 615, the method 600 may include determining whether the files are being created by the information handling system at block 620. Where there are no files being created by the information handling system at block 620, the method may continue to block 630 with determining whether the interim edge storage management system has received a request from a client information handling system to access online files (e.g., at the virtual network-attached edge storage device or on one or more network file hosting systems). This is described in more detail herein.

Where it has been determined that the files were created at the client information handling system at block 620, the synchronization of these created files may include, at block 625, saving those files to a virtual network-attached edge storage device 659. As described herein, because the file was created and is now being saved, the access time period threshold for the file to qualify as an MRU file has been met and the file is saved to the virtual network-attached edge storage device 659 of the interim edge storage management system. The edge synch agent will synchronize those files that have been created on the information handling system and determine location to store those files on the virtual network-attached edge storage device 659 or the one or more network file hosting systems 658. In an embodiment, the edge synch agent will also update the active directory synchronization files from a cloud computing management console such that the storage orchestrator of the interim edge storage management system may track data or files are to be located on the virtual network-attached edge storage device 659 or one or more network file hosting systems 658. The determination that a file is being created on a client information handling system allows the client information handling system or any other additional client information handling systems to access the created file at the virtual network attached edge storage device 549 by the interim edge storage management system instead of on a network file hosting system 658 thereby reducing the latency in retrieving that information. As an example, if the created file was an operation standard for an assembly line that is used to coordinate operations on an assembly line floor, the lower latency of retrieving this information will reduce costs associated with any downtime at the assembly line. In another example, if the file is an executable program describing how a self-driving car is to operate, the low latency may prevent damage to the car or injury to an occupant.

The method 600 may continue, at block 630 with determining whether a request to access files has been made from a client information handling system or a plurality of client information handling systems. These files may include online or remote files that are stored on one or more network file hosting systems or a virtual network-attached edge storage device associated with the interim edge storage management system rather than locally on the client information handling system. Where a user is not accessing these online files at block 630, the method 600 may utilize local storage or may determine files are unavailable and continue with block 675 with determining whether the interim edge storage management system is shut down or shutting down. Where the interim edge storage management system is shut down, the method 600 may end. Where the interim edge storage management system is not shut down, the method may continue to block 635 described herein.

Where the client information handling system request is to access online or remotely-stored files, the user, in attempting to access these online or remote files, may not be made aware of where any given files is stored whether it is on the virtual network-attached edge storage device or the one or more network file hosting systems at block 630. In an embodiment, the user may interface with a storage orchestrator of the interim edge storage management system that references a local active directory or cloud active directory to determine where these files are stored or copied. To the user, the file access may appear no differently than an access of a local file or there may be some indication when a file is online or remote, but there may be seamless access to those files regardless of whether it is on the virtual network-attached edge storage device or the one or more network file hosting systems.

Where a user is accessing these online files at block 630, the method 600 may continue at block 635 with determining whether the files being requested by the user are located on the virtual network-attached edge storage device. This may be conducted with the storage orchestrator accessing a local active directory for the current files stored at the virtual network-attached edge storage device in some embodiments. Where the storage orchestrator determines that the requested files are stored on the virtual network-attached edge storage device, the method 600 continues to block 637 with accessing the virtual network-attached edge storage device at 659 for the user and directing the user to that file for access. The virtual network-attached edge storage device at 659 may be any, for example, server with memory storage capacity that is co-located at or near the operation of a client information handling system such as on premises of an enterprise or at a location within a localized geographic area for a nearby network access such as a building, campus, neighborhood, town, county, metropolitan area or similar that is closer than a remote data center located in a different metropolitan area, state or even country. Again, the agent associated with the client information handling system may interface seamlessly with this process such that the user is not aware of where the file is stored. Further, such accesses may update the local active file directory and reset the time period monitoring relative to an access time period threshold for MRU designation among other aspects of the synchronization and the interim edge storage management system in various embodiments. Upon accessing and retrieving the file from the virtual network-attached edge storage device 659, the flow may proceed to block 675 to determine if the interim edge storage management system is shutting down. If so, the process may end. If not, the process may return to block 620 to monitor for additional files being created or modified at client information handling systems or for monitoring for file access requests, such as at 630, from client information handling systems as described.

Where the user-requested online file is not on the virtual network-attached edge storage device 659 at block 635, the method 600 includes determining whether the online files are located on one or more of the network file hosting systems 658 at block 640. Further, the storage orchestrator may access a cloud active directory the is synched with the local active directory to determine if and which network file hosting system 658 may have the stored file. Again, the one or more of the network file hosting systems 658 may be any, for example, subscription-based file hosting system that, in an embodiment, includes data storage limits. Example network file hosting systems 658 may include, for example, Microsoft Azure @developed by Microsoft®, Google Drive® developed by Google®, Amazon Simple Storage Service® developed by Amazon®, and Microsoft OneDrive® developed by Microsoft®, among other network file hosting systems. Such network file hosting systems may store data at a remote data center or centers located at further distances from the client information handling system, but may provide greater storage resources at each or among them. Where it is determined at block 640 that the user-requested files are not on one or more of the network file hosting systems, the method 600 may proceed with, in an embodiment, the storage orchestrator notifying the client device (e.g., an information handling system operated by the user) that the file is not found at block 645. Where the storage orchestrator, via the cloud active directory, determines that the user-requested file is on one or more network file hosting systems and on which one it is stored at block 640, the method continues to block 650 with accessing the network file hosting system 658 where the file is stored. Then the file may be retrieved by the interim edge storage management system and provided to the requesting client information handling system. At this point the edge synch agent and storage orchestrator may update the active local directory and the active cloud directory of the interim edge storage management system and store the retrieved file at the virtual network-attached edge storage device as it is a recent access in an embodiment. As described herein, the network file hosting system 658 may be one of a plurality of network file hosting systems where a single file is stored among them and/or backed up by another network file hosting system or the virtual network-attached edge storage device. Upon accessing and retrieving the file from the remote network file hosting system 658, the flow may proceed to block 675 to determine if the interim edge storage management system is shutting down. If so, the process may end. If not, the process may return to block 620 to monitor for additional files being created or modified at client information handling systems or for monitoring for file access requests, such as at 630, from client information handling systems as described.

In another aspect, interim edge storage management system the virtual network-attached edge storage device 659 operating at block 615 and determining authorization and synchronization of files with client information handling systems may also include monitoring function to monitor access frequency of files within the local active directory on the virtual network-attached edge storage device 659 or in the cloud active directory in synchronizing files with one or more network file hosting systems 658. The virtual network-attached edge storage device 659 may have limited storage capacity relative to the network file hosting systems 658 and thus, storage at the edge storage device location may be limited as among one or more client information handling systems accessing this storage resource based upon recency of use for files, frequency of use of files, or criticality of file access speed based on file types or application context executing on the client information handling system or systems. Such a combination of factors are used to determine priority of those files to remain in the active local directory for storage at the virtual network-attached edge storage device 659 instead of the network file hosting systems 658.

In one embodiment, an access time-period threshold may determine the status of a file as an MRU file. The interim edge storage management system may determine or cull files that fall outside of the access-time-period threshold from the local active directory and the virtual network-attached edge storage device 659 and transition those files in the cloud active directory and select storage at one of the network file hosting systems 658. Further, if the virtual network-attached edge storage device 659 is nearing storage capacity, new files may be added while last in files may be transitioned to the network file hosting system 658 and the local active directory and cloud active directories updated accordingly for the storage orchestrator.

In yet other embodiments, contextual priority may be attached to files with metadata from the client information handling system or via the interim edge storage management system. For example, certain types of files, such as archival files may not require low-latency access relative to files such as those used in automated manufacturing operations, self-driving or robotic self-operating applications, or other latency critical files during execution of applications by one or more client information handling systems. The contextual priority may further be adjustable by an IT administrator of the interim edge storage management system to provide certain software applications operating on client information handling system a high priority designation or others a low priority designation based on received metadata identifying the type of file to be stored among the virtual network-attached edge storage device 659 or the network file hosting systems 658 for particular contexts in an example embodiment. There may be a ranking system of application contexts for files stored and managed by the interim edge storage management system in an embodiment that may include two or more levels of ranking priority of contextual file types. This contextual priority may be an additional factor to the access time-period threshold measurement and assessment in some embodiments. Further, the interim edge storage management system may include a frequency of access measurement and use of this assessment by the interim edge storage management system to assign priority relative to files accessed infrequently of a access frequency time period as distinct from an access (recency) time period as discussed above. This frequency priority may be an additional factor to the access time-period threshold measurement and contextual priority factors in some embodiments.

At block 660, the storage orchestrator of the interim edge storage management system may concurrently determine whether the user has accessed this file on the network file hosting system within the access time period threshold (e.g., last 24 hours) and may weight this assessment in an embodiment by contextual priority rating or by frequency of access ratings. As described herein, the storage orchestrator and the interim edge storage management system allows for low latency access to files that any given client device has accessed. Such low latency access may further be weighted toward high priority contextual file types or those that are frequency accessed. At block 670, those files may be stored on a virtual network-attached edge storage device and a local active directory and the cloud active directory updated accordingly for the storage orchestrator.

At block 665, files that exceed an access time-period threshold may be transitioned to be stored on one or more network file hosting systems when it is determined that the files no longer qualify as MRU files (e.g., those files not accessed within the access time period threshold). In some embodiments, the access time-period threshold determination may be weighted with the additional contextual or frequency weighting factored in as well. Where it is determined at block 660 that the file has not been accessed within the access time period threshold, the method 600 may include at block 665 transitioning to store those files to a network file hosting system at 658. Where, at block 660, it has been determined that the user has accessed this file within the access time period threshold (or any other threshold period of time based on the active directory synchronization files received by the storage orchestrator), the method 600 includes storing those files accessed by the user on the virtual network-attached edge storage device at 659.

After storage of any files within the virtual network-attached edge storage device at block 659 at block 670 or, at one or more of the network file hosting systems at block 665, the method 600 may continue with block 675 with determining whether the interim edge storage management system is shut down or shutting down. Where the interim edge storage management system is shut down, the method 600 may end. Where the interim edge storage management system is not shut down, the method may continue to block 620 and proceed to monitor for files to be saved or accessed by client information handling system via the interim edge storage management system as described in embodiments herein.

Figure 7:
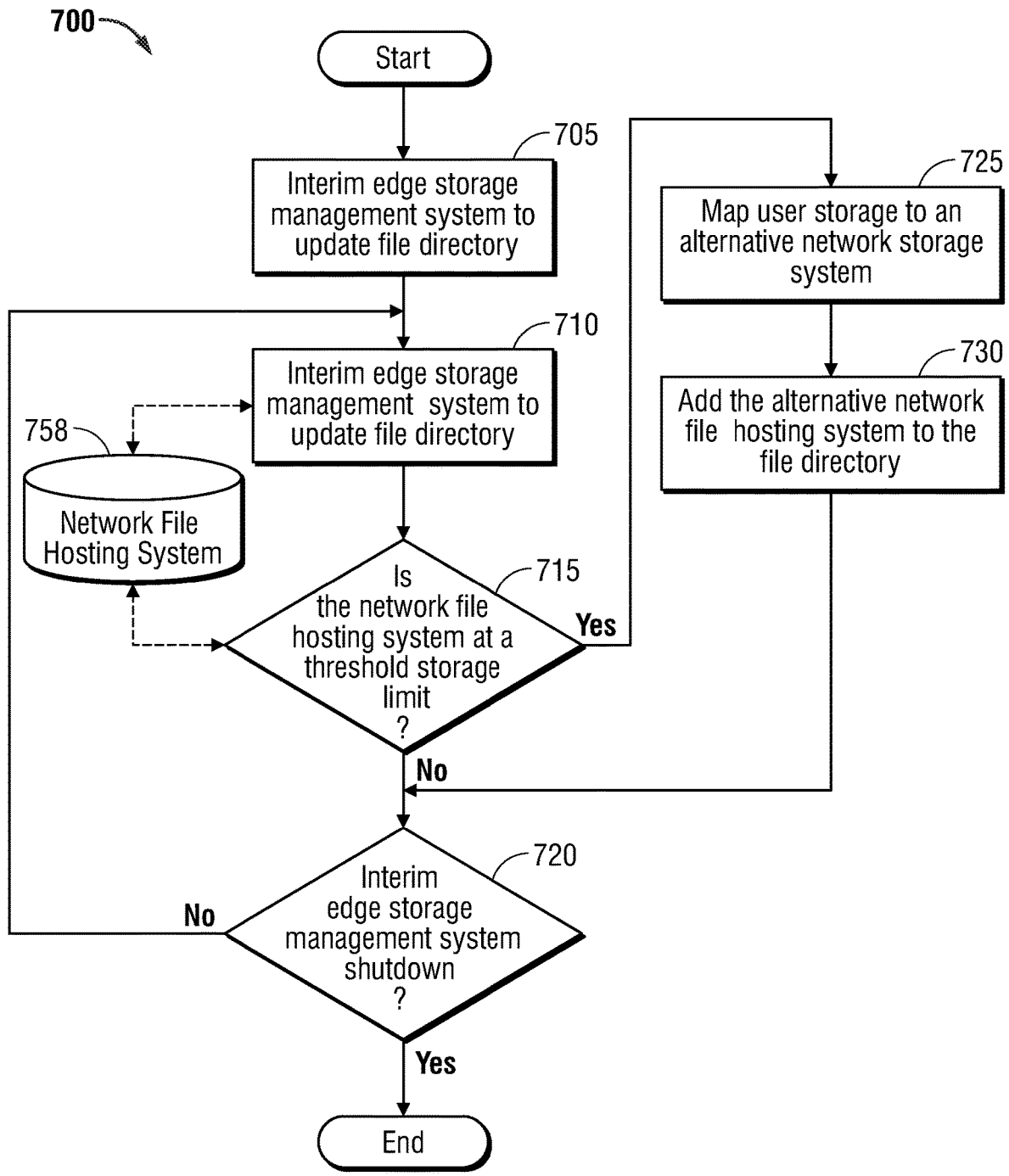
FIG. 7 is a flow diagram of a method of executing one or more network file hosting systems with an interim edge storage management system according to an embodiment of the present disclosure.

FIG. 7 is a flow diagram of a method 700 of executing one or more network file hosting systems with an interim edge storage management system according to an embodiment of the present disclosure. The method 700 may be descriptive of storing data and files on one or more network file hosting systems and may be from the perspective of a storage orchestrator according to information provided by a cloud active directory as well as synchronization and management of files between the network file hosting systems and the virtual network-attached edge storage device. In an aspect, the interim edge storage management system may provide a service to add one or more addition remote network file hosting systems when a storage threshold is approached at existing network file hosting systems in an embodiment. This may be done seamlessly according to embodiments herein with the interim edge storage management system establishing an API and authentication for access to a newly added network file hosting system for additional cloud storage capacity. Further, the interim edge storage management system may then provide coordination and synchronization of data files as between the network file hosting systems including the newly added network file hosting system and the virtual network-attached edge storage device as with other embodiments.

The method 700 includes, at block 705, the interim edge storage management system (e.g., the storage orchestrator) to update a file directory. The file directory may include a cloud active directory to define to the storage orchestrator of the interim edge storage management system what files are stored where among the one or more network file hosting systems. As described in additional previous embodiments herein, the interim edge storage management system may also maintain an active local directory as part of the file directory for synchronization and coordination for file storage at the virtual network-attached edge storage device. In an embodiment, a single copy of any given file may be saved in a virtual network-attached edge storage device and in one or more of the network file hosting systems or may be alternatively stored between these two storage resources. In one embodiment, the one or more network file hosting systems may serve as a back-up location for files stored on the virtual network-attached edge storage device. The file directory, including the active local directory and the cloud active directory, may be updated periodically or when requested by the interim edge storage management system as indicated at block 705.

The method 700 may also include, at block 710, accessing the one or more network file hosting systems with the storage orchestrator executing one or more APIs as described herein. Because the storage orchestrator executes APIs that automatically provide access to one or more network file hosting systems, the user of a client information handling system is unaware of where the files are stored since the interim edge storage management system handles coordination of this. Still further, because the network file hosting systems 758 each have their own service costs and because each network file hosting system 758 may be under a service contract that includes one or more storage limits that may invoke additional costs or additional contractual engagement upon reaching one or more storage thresholds, the interim edge storage management system may coordinate among plural network file hosting systems. Additionally, the interim edge storage management system may add new network file hosting systems 758 when certain storage limits are reached rather than enter into complicated storage expansion procedures or pay higher storage costs for a nearly full network file hosting system in embodiments herein. Thus, the interim edge storage management system with the storage orchestrator controls, seamlessly, the accessing and storage of any given file on behalf of any client information handling system operatively coupled to the interim edge storage management system as among the existing and the addition of new network file hosting systems as needed. Examples of a plurality of network file hosting systems managed by the interim edge storage management system may include, for example, Microsoft Azure® developed by Microsoft®, Google Drive® developed by Google®, Amazon Simple Storage Service® developed by Amazon®, and Microsoft OneDrive® developed by Microsoft®, among other network file hosting systems. As described herein, the storage orchestrator may direct the saving of files or data to any of these plurality of network file hosting systems 758. In an embodiment, the storage orchestrator may have directed that certain files be placed within certain network file hosting systems 758 while other network file hosting systems 758 are used as backup sites for those files. Still further, in an example embodiment, the storage orchestrator may direct those files and data be saved among each of the network file hosting systems 758 operatively coupled to the storage orchestrator to maintain, roughly, even amounts of data for the enterprise. In an embodiment, the storage orchestrator of the interim edge storage management system may monitor for storage limits in each of the network file hosting systems.

The method 700 includes at block 715 determining whether any of the network file hosting systems is at a threshold storage limit. As described herein, the interim edge storage management system may determine for each the network file hosting systems its customized data and file storage limit that is set, in some example embodiments, by a subscription agreement between the network file hosting system and the enterprise/client device. For example, customers of OneDrive® by Microsoft® may be limited to 1 terabyte (1 TB) per user. These customers may be able to increase the data storage (e.g., 5 TB) with an increased subscription cost. Further, customers may be able to increase data storage above 5 TB with a complicated change to the contractual terms of the data storage service. Any additional storage capacities may be limited to the users by administrators of the network file hosting system and may be granted on a case-by-case basis. These extra steps may be cumbersome to the user or an administrator and may increase the costs of operation for the user. Still further, latency issues may arise when a user is attempting to access the files stored on the network file hosting system.

Where it is determined, at block 715, that one or more of the network file hosting systems have not reached a threshold storage limit such that remote storage capacity is sufficient for the interim edge storage management system, the method may continue at block 720 with determining whether the interim edge storage management system is shut down or shutting down. Where the interim edge storage management system is shut down, the method 700 may end. Where the interim edge storage management system is not shut down, the method may continue to block 725 as described herein. At block 715 and prior to block 720, the interim edge storage management system may allow for the storage orchestrator to save any files or data to the network file hosting system that are determined to not meet the requirements of being an MRU file.

Where it is determined, at block 720, that any of the plurality of network file hosting systems are at a threshold storage limit, the method 700 includes mapping a user/client device storage to an alternative network file hosting system that has more storage space at block 725. This may include searching for a network file hosting system that has not yet reached its threshold data storage limits in an embodiment. This may assist in determining whether to add an additional network file hosting system or whether the currently engaged network file hosting systems, if more than one are engaged by the interim edge storage management system, are of sufficient capacity to accommodate the operations of interim edge storage management system in servicing the one or more client information handling systems.

In an example embodiment where all accessible network file hosting system are approaching a threshold storage limit such as to incur additional storage costs or to trigger requirement of storage provider approvals to utilize even greater storage capacity at that service for a network file hosting system, the interim edge storage management system with the storage orchestrator may create a new account with an existing or a new network file hosting system in order to provide more storage capacity for those non-MRU files or back-ups of MUR files. In an embodiment, at block 730, the method 700 may include adding this alternative network file hosting system to the file directory by, for example, initiating a new subscription with a network file hosting system not yet operatively coupled to the storage orchestrator. Alternatively, this new subscription may include entering into an increased data storage limit with an existing network file hosting system operatively coupled to the storage orchestrator. With a newly added network file hosting system, the interim edge storage management system may establish an API and authentication credential with the newly added network file hosting system for access to storage located with that service in an embodiment. Further, the interim edge storage management system may add the newly added network file hosting system to the cloud active directory and the file directory of the storage orchestrator and being coordination and synchronization of file storage and access with the newly added network file hosting system as well as previous network file hosting systems and the virtual-network attached edge storage device according to the embodiments herein.

Upon adding the new, alternative file hosting system at block 730, the method 700 may continue with determining whether the interim edge storage management system is shut down or shutting down at block 720. Where the interim edge storage management system is shut down, the method 700 may end. Where the interim edge storage management system is not shut down, the method may continue to block 710 as described herein.

The blocks of the flow diagrams of FIGS. 5 through 7 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of operating an interim edge storage management system of a storage management information handling system operatively coupled with an edge storage device and a plurality of remote network file hosting systems comprising:

accessing, with a processor executing code instructions of the interim edge storage management system, one or more storage policies, the storage policies being descriptive of how a plurality of data files used by a client device are to be stored on the edge storage device and on one or more of the plurality of remote network file hosting systems;

with the processor, receiving credentials of the client device and authenticating the client device for use with the interim edge storage management system to access the edge storage device and the plurality of remote network file hosting systems managed by the interim edge storage management system;

with the processor executing computer readable program code of a storage orchestrator, directing how the storage of a first set of existing data files accessed, updated, saved, or otherwise manipulated by the client device are selected to be stored among the edge storage device and the one or more of the plurality of remote network file hosting systems based on recency of usage of the first set of existing data files;

with the processor executing computer readable program code of a storage orchestrator, manage access by the client device to the edge storage device and the plurality of remote network file hosting systems via an edge local active directory synched with a cloud active directory of the edge storage device and the plurality of remote network file hosting systems and selecting storage of the existing data files accessed, updated, saved, or otherwise manipulated by the client device from among the edge storage device and the plurality of remote network file hosting systems for the storage of one or more data files from a most recently used (MRU) data set to be stored on the edge storage device and one or more data files from a less recently used data set to be stored on the plurality of remote network file hosting systems, wherein the first MRU data set includes data files accessed, updated, saved, or otherwise manipulated by the client information handling system that are different from the second less recently used data set of the client information handling system;

gathering information on storage capacity limits being reached at a first remote network file hosting system with a first hosting service of the plurality of remote network file hosting systems the storage orchestrator; and transitioning storage of a portion of the second less recently used data set of existing data files accessed, updated, saved, or otherwise manipulated by the client device to a second remote network file hosting system with a second hosting service of the plurality of remote network file hosting systems based on the gathered information of storage capacity limits.

2. The method of claim 1 further comprising:

adding a new remote network file hosting system to the plurality of remote network file hosting systems based on storage capacity thresholds being reached at the first remote network file hosting system.

3. The method of claim 1 further comprising:

managing, with the processor executing computer readable code instructions of the storage orchestrator, the storage of the first set of existing data files and a second set of recent data files from accessing, updating, saving, or otherwise manipulating by the client device onto the edge storage device based on the usage recency of those first set of existing data files and the second set of recent data files and application of a application priority context to the first set of existing data files and the second set of recent data files pursuant to a storage policy for application priority for data files to be stored at the edge storage device.

4. The method of claim 1 further comprising:

storing, with the processor executing computer readable code instructions of the storage orchestrator, a recent data file from the second set of recent data files from accessing, updating, saving, or otherwise manipulating by the client device within edge storage device and replacing the data file from the first set of existing data files in the edge storage device using a first-in-first-out data storage policy.

5. The method of claim 1 further comprising:
automatically storing, synchronizing, and transitioning, with the processor executing computer readable code instructions of the storage orchestrator, data files from the first set of existing data files and the second set of recent data files stored from plural client devices operatively coupled to the interim edge storage management system of the storage management information handling system across the edge storage device and the plurality of remote network file hosting systems.

6. The method of claim 1 further comprising:
executing, with the processor executing computer readable code instructions of the storage orchestrator, one or more application programming interfaces (APIs) to interface the storage orchestrator with the plurality of remote network file hosting systems from a plurality of hosting services, where a portion of the plurality of hosting services require different authentication and access requirements from other hosting services; and
gathering data storage information related to the storage capacity limits of the plurality of remote network file hosting systems.

7. A storage management information handling system for providing storage management services to a client information handling system comprising:
a processor;
a memory device;
a power management unit (PMU);
the processor executing computer readable program code instructions of an interim edge storage management system, the processor of the storage management information handling system operatively coupled to the client information handling system, an edge storage device, and a plurality of remote network file hosting systems managed by the interim edge storage management system executing on the storage management information handling system;
the processor executing computer readable program code instructions of the interim edge storage management system to receive credentials of the client information handling system and authenticate the client information handling system for use with the interim edge storage management system to access the edge storage device and the plurality of remote network file hosting systems managed by the interim edge storage management system;
the processor executing computer readable program code instructions of the interim edge storage management system that includes a storage orchestrator to manage access by the client information handling system to select among the edge storage device and the plurality of remote network file hosting systems via an edge local active directory synched with a cloud active directory of edge storage devices and the plurality of remote network file hosting systems; and
the processor executing computer readable program code instructions of the interim edge storage management system to select storing a first most recently used (MRU) data set of the client information handling system from data files most recently accessed, updated, saved, or otherwise manipulated by the client information handling system at the edge storage device and select storing a second less recently used data set of data files less recently accessed, updated, saved, or otherwise manipulated by the client information handling system at the plurality of remote network file hosting systems managed by the interim edge storage management system, wherein the first MRU data set includes data files accessed, updated, saved, or otherwise manipulated by the client information handling system that are different from the second less recently used data set of the client information handling system.

8. The storage management information handling system of claim 7 further comprising:
the processor executing computer readable program code instructions of the storage orchestrator to gather data storage information related to the storage of one or more of the data files from the first MRU dataset stored on the edge storage device or the storage of one or more of the data files of the second less recently used data set stored on the plurality of remote network file hosting systems; and
the storage orchestrator to adjust the amount of data stored on the edge storage device to at least one of the plurality of remote network file hosting systems based on one or more storage policies by transitioning files from the edge storage device to the at least one remote network file hosting system based on assessment of the data files of the first MRU dataset under the one or more storage policies.

9. The storage management information handling system of claim 7 further comprising:
the processor executing computer readable program code instructions of the storage orchestrator to gather data storage information related to the storage of one or more files of the second less recently used data set stored on the plurality of remote network file hosting systems; and
the storage orchestrator to adjust the amount of data stored on the plurality of remote network file hosting systems based on one or more storage policies applied to the one or more files of the second less recently used data set by transitioning files from a first remote network file hosting system to a second remote network file hosting system based on storage capacity thresholds being reached at the first remote network file hosting system.

10. The storage management information handling system of claim 7 further comprising:
the processor executing computer readable program code instructions of the storage orchestrator managing the storage and transitioning of the data file onto the edge storage device based on the detected recency of usage of the data file by accessing, updating, saving, or otherwise manipulating by the client information handling system and an application priority context storage policy applied to the data file from the first MRU dataset to be stored at the edge storage device.

11. The storage management information handling system of claim 7 further comprising:
the processor executing computer readable program code instructions of the storage orchestrator managing the storage and transitioning of the file onto the edge storage device based on the recency of usage of the data file by accessing, updating, saving, or otherwise manipulating by the client information handling system and based on a frequency of access of the data file from the first MRU dataset by the client information handling system.

12. The storage management information handling system of claim 7, wherein the storage orchestrator transitions data files to the plurality of remote network file hosting systems when access to those data files falls outside of an access time-period threshold such that the data files are part of the second less recently used dataset accessed by the information handling system.

13. The storage management information handling system of claim 7 further comprising:
the processor executing computer readable program code instructions of the storage orchestrator operatively coupled to the edge storage device storing and tracking data files of the from the first MRU dataset from the client information handling system for storage on the edge storage device and enforcing rules for actively transitioning other data files on the edge storage device to at least one remote network file hosting system based on one or more priority factors from storage policies.

14. The storage management information handling system of claim 7 further comprising:
the processor executing one or more application programming interfaces (APIs) executable for the storage orchestrator to interface with the plurality of remote network file hosting systems that are diverse remote network file hosting systems having file directories and formatting developed by a plurality of network file hosting services.

15. A storage management information handling system for providing storage management services to a client device comprising:
a processor;
a memory device;
a power management unit (PMU); and
the processor executing computer readable program code of an interim edge storage management system, the processor of the storage management information handling system operatively coupled to the client device, an edge storage device, and a plurality of remote network file hosting systems managed by the interim edge storage management system to manage storage of data files from the client device among the edge storage device and the plurality of remote network file hosting systems;
the processor executing computer readable program code of the interim edge storage management system to receive credentials of the client information handling system and authenticate the client information handling system for use with the interim edge storage management system to access the edge storage device and the plurality of remote network file hosting systems managed by the interim edge storage management system;
the processor executing computer readable program code of the interim edge storage management system that includes a storage orchestrator to manage selecting storage of the data files by the client device from among the edge storage device and the plurality of remote network file hosting systems via an edge local active directory of the edge storage device and plurality of remote network file hosting systems by selecting to store the data files accessed, updated, saved, or otherwise manipulated by the client device from among the edge storage device and the plurality of remote network file hosting systems based on recency of usage of the data files at the client device; and the processor executing computer readable program code of the storage orchestrator to gather data storage information related to the storage of one or more data files from a most recently used (MRU) data set to be stored on the edge storage device and one or more data files from a less recently used data set to be stored on the plurality of remote network file hosting systems; and
the processor executing computer readable program code of the storage orchestrator to adjust the amount of the data stored on the edge storage device to at least one of the plurality of remote network file hosting systems based on one or more storage policies relating to storage capacity limits of the edge storage device by transitioning a portion of the data files from the edge storage device to the at least one remote network file hosting system for files that meet or exceed an access time-period threshold to transition those data files into the second less recently used dataset, wherein the first MRU data set includes data files accessed, updated, saved, or otherwise manipulated by the client information handling system that are different from the second less recently used data set of the client information handling system.

16. The storage management information handling system of claim 15 further comprising:
the processor executing computer readable program code of the storage orchestrator to gather data storage information related to the storage of one or more data files of the second less recently used dataset stored on the plurality of remote network file hosting systems; and
the processor to adjust the amount of the data stored on the plurality of remote network file hosting systems via transfer of the datafiles based on one or more storage policies relating to storage capacity limits of the remote network file hosting systems by transitioning data files from a first remote network file hosting system to a second remote network file hosting system based on storage capacity thresholds being reached at the first remote network file hosting system.

17. The storage management information handling system of claim 15 further comprising:
the processor executing computer readable program code of the storage orchestrator to manage the storage and transitioning of the data files of the first MRU dataset onto the edge storage device based on the recency of usage of the data files at the client device as well as a storage policy of an application priority context of the data files from an application at the client device having an assigned priority to be stored at the edge storage device.

18. The storage management information handling system of claim 15 further comprising:
the processor executing computer readable program code of the storage orchestrator to manage the storage of data files of the first MRU dataset by transitioning of one of more data files of the first MRU dataset onto the edge storage device based on detection of the recency of usage of the one or more data files at the client device and application of a storage policy relating to a frequency of access of the one or more data files.

19. The storage management information handling system of claim 15 further comprising:
the processor executing computer readable program code of the storage orchestrator operatively coupled to the edge storage device storing and tracking data files of the first MRU data set accessed, updated, saved, or otherwise manipulated by from the client device for storage on the edge storage device and enforcing rules for actively transitioning other data files falling into a second less recently used data set on the edge storage device to at least one remote network file hosting system based on one or more priority factors.

20. The storage management information handling system of claim 15 further comprising:

the processor executing one or more application programming interfaces (APIs) executable for the storage orchestrator to interface with the plurality of remote network file hosting systems that are diverse remote network file hosting systems having file directories and formatting developed by a plurality of network file hosting services.

\* \* \* \* \*